(12) United States Patent
Wang et al.

(10) Patent No.: US 9,155,139 B2
(45) Date of Patent: Oct. 6, 2015

(54) LED DRIVER CIRCUITS AND METHODS

(75) Inventors: Yutao Wang, Brookfield, WI (US); Darrell S. Filtz, Cedarburg, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 640 days.

(21) Appl. No.: 13/416,107

(22) Filed: Mar. 9, 2012

(65) Prior Publication Data

US 2013/0234620 A1 Sep. 12, 2013

(51) Int. Cl.
*H05B 37/02* (2006.01)
*H05B 33/08* (2006.01)

(52) U.S. Cl.
CPC ............ *H05B 33/0815* (2013.01); *Y02B 20/347* (2013.01)

(58) Field of Classification Search
USPC ......... 315/291, 297, 298–300, 302, 306, 307, 315/209 R, 224
See application file for complete search history.

(56) References Cited

U.S. PATENT DOCUMENTS

| | | | |
|---|---|---|---|
| 4,641,132 A | 2/1987 | Reger | |
| 4,678,946 A | 7/1987 | Nagano | |
| 5,675,640 A | 10/1997 | Tappert et al. | |
| 6,522,558 B2 | 2/2003 | Henry | |
| 6,556,067 B2 | 4/2003 | Henry | |
| 6,600,274 B1 | 7/2003 | Hughes | |
| 6,636,104 B2 | 10/2003 | Henry | |
| 6,734,639 B2 | 5/2004 | Chang et al. | |
| 6,798,152 B2 | 9/2004 | Rooke et al. | |
| 6,812,776 B2 | 11/2004 | Henry | |
| 6,897,709 B2 | 5/2005 | Henry | |
| 6,949,889 B2 | 9/2005 | Bertrand | |
| 6,989,807 B2 | 1/2006 | Chiang | |
| 7,007,005 B2 | 2/2006 | Rautenback et al. | |
| 7,039,738 B2 | 5/2006 | Plummer et al. | |
| 7,058,929 B2 | 6/2006 | Charnell et al. | |
| 7,080,849 B2 | 7/2006 | Lammer | |
| 7,233,115 B2 | 6/2007 | Lys | |
| 7,256,554 B2 | 8/2007 | Lys | |
| 7,264,381 B2 | 9/2007 | Liu et al. | |
| 7,276,861 B1 | 10/2007 | Shteynberg | |
| 7,276,863 B2 | 10/2007 | Lee | |
| 7,301,288 B2 | 11/2007 | Green | |
| 7,317,403 B2 | 1/2008 | Grootes et al. | |
| 7,330,019 B1 | 2/2008 | Bennett | |
| 7,359,893 B2 | 4/2008 | Sadri et al. | |
| 7,425,803 B2 | 9/2008 | Shao | |

(Continued)

FOREIGN PATENT DOCUMENTS

WO 2011052834 5/2011

OTHER PUBLICATIONS

European Search Report, EP 13 15 8656, Oct. 21, 2013, 7 pages.

*Primary Examiner* — Douglas W Owens
*Assistant Examiner* — James H Cho
(74) *Attorney, Agent, or Firm* — Quarles & Brady LLP (57) ABSTRACT

An LED driver circuit that can regulate the input signal voltage so that the driver circuit can be used over wide input voltage range or at predetermined voltages. Discrete components are used to drive an LED array with a constant current. The LED driver circuit includes a dynamic current regulator. The dynamic current regulator includes a resistor and capacitor in parallel to provide dynamic current regulation to a switching mode power supply circuit that controls the LED illumination.

17 Claims, 6 Drawing Sheets

(56) References Cited

U.S. PATENT DOCUMENTS

| | | |
|---|---|---|
| 7,443,109 B2 | 10/2008 | De Anna et al. |
| 7,459,864 B2 | 12/2008 | Lys |
| 7,486,060 B1 | 2/2009 | Bennett |
| 7,511,436 B2 | 3/2009 | Xu |
| 7,511,437 B2 | 3/2009 | Lys |
| 7,521,875 B2 | 4/2009 | Maxik |
| 7,535,183 B2 | 5/2009 | Gurr |
| 7,551,383 B1 | 6/2009 | Kupferman |
| 7,554,473 B2 | 6/2009 | Melanson |
| 7,557,521 B2 | 7/2009 | Lys |
| 7,569,996 B2 | 8/2009 | Holmes et al. |
| 7,595,622 B1 | 9/2009 | Tomiyoshi et al. |
| 7,643,322 B1 | 1/2010 | Varga et al. |
| 7,649,325 B2 | 1/2010 | McIntosh et al. |
| 7,659,673 B2 | 2/2010 | Lys |
| 7,667,408 B2 | 2/2010 | Melanson |
| 7,696,913 B2 | 4/2010 | Melanson |
| 7,719,246 B2 | 5/2010 | Melanson |
| 7,719,248 B1 | 5/2010 | Melanson |
| 7,733,189 B1 | 6/2010 | Bennett |
| 7,737,643 B2 | 6/2010 | Lys |
| 7,746,043 B2 | 6/2010 | Melanson |
| 7,750,579 B2 | 7/2010 | Aiello |
| 7,750,616 B2 | 7/2010 | Liu |
| 7,755,525 B2 | 7/2010 | Nanda et al. |
| 7,759,881 B1 | 7/2010 | Melanson |
| 7,799,545 B2 | 9/2010 | Burgard et al. |
| 7,803,589 B2 | 9/2010 | Burk et al. |
| 7,804,256 B2 | 9/2010 | Melanson |
| 7,804,697 B2 | 9/2010 | Melanson |
| 7,821,237 B2 | 10/2010 | Melanson |
| 7,825,612 B2 | 11/2010 | Lee |
| 7,825,644 B1 | 11/2010 | Ling |
| 7,847,486 B2 | 12/2010 | Ng |
| 7,852,010 B2 | 12/2010 | Negley |
| 7,852,017 B1 | 12/2010 | Melanson |
| 7,858,350 B2 | 12/2010 | Burk et al. |
| 7,888,882 B2 | 2/2011 | Wang et al. |
| 7,915,836 B2 | 3/2011 | Cheng |
| 7,960,920 B2 | 6/2011 | Holmes et al. |
| 8,018,177 B2 | 9/2011 | Goo et al. |
| 8,033,183 B2 | 10/2011 | Reichart et al. |
| 8,058,812 B2 | 11/2011 | Negrete |
| 8,610,358 B2 * | 12/2013 | Reed .............................. 315/126 |
| 2005/0152123 A1 * | 7/2005 | Voreis et al. ....................... 362/3 |
| 2005/0213353 A1 | 9/2005 | Lys |
| 2007/0040516 A1 | 2/2007 | Chen |
| 2008/0278092 A1 * | 11/2008 | Lys et al. ....................... 315/247 |
| 2008/0304299 A1 | 12/2008 | Bormann |
| 2009/0212721 A1 | 8/2009 | Maruyama |
| 2011/0068704 A1 | 3/2011 | McKinney |
| 2011/0121744 A1 | 5/2011 | Salvestrini |
| 2011/0266969 A1 | 11/2011 | Ludorf |

* cited by examiner

LED DRIVER CIRCUITS AND METHODS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The subject matter disclosed herein relates generally to driver circuits for a load, and, more particularly, to a driver circuit that will allow a load, such as an LED, to be operated over a wide input voltage range.

A variety of different electrical power sources can be used to power an LED driver circuit. These include both alternating current (AC) and direct current (DC) power sources, such as those provided by wall sockets (120 or 240 VAC at 50 or 60 Hz) or DC power supplies (typically 24 VDC to about 240 VDC) and the like. Conventional AC power sources, such as those provided by wall sockets from power lines (line voltage) are typically 110 or 220 VAC at 50 or 60 Hz, and other voltage and frequency combinations are used throughout the world. AC voltage sources must first be rectified to become DC voltage sources before using them to drive LEDs. Further, line voltage components that would be required to compensate for these problems are usually rather large and more expensive than their lower voltage counterparts.

Use of a rectified AC supply voltage, or a pure DC supply voltage, avoids some of the complications of an AC input, but is not without complications of its own. For example, the actual output voltage of any given voltage source is rarely exactly equal to its specified nominal voltage. As an example, the nominal output voltage of 12 VDC battery systems like those used in automobiles is seldom exactly 12 VDC, but rather typically varies between about 11 VDC and about 15 VDC.

One difficulty associated with LED driver circuits in general is the large number of catalog numbers that need to be manufactured and warehoused. Typically, an LED driver circuit is designed for only one specific supply voltage. If you are a manufacturer, you want to offer a full product line, which means offering a large variety of driver circuits that operate at their respective supply voltage. If you are an integrator or an OEM using LEDs, this mean that you need to have available a large selection of driver circuits that operate at different voltages for your application's needs. Attempts to accommodate LED driver circuits to operate on more than one supply voltage results in increased size, cost, and heat generation.

Supply power disruptions such as voltage dips and interruptions are common to industrial control circuits and can produce undesirable effects such as LED flickering or dimming. Ride-through is a term used to describe the ability to withstand voltage dips and interruptions with steady LED illumination. During a voltage dip for a conventional design, a low voltage drop would occur across a current regulation resistor, which would cause the transistor to switch off and the LED to dim or turn off.

Still other difficulties associated with LED driver circuits reside in the presence of leakage current from upstream circuitry used to energize the LEDs. Even low levels of leakage current can cause an LED to slightly illuminate even when the driver circuit is in an off-state.

There is a need, therefore, for an improved driver circuit that will allow a load, such as an LED, to be operated over a wide input voltage range, while at the same time, that can improve both ride-through and surge capabilities, and require fewer catalog numbers.

BRIEF DESCRIPTION OF THE INVENTION

The present embodiments overcome the aforementioned problems by providing a circuit that can regulate the input signal voltage so that a single driver circuit can be used over a wide input voltage range. This innovation uses all discrete components to drive one or more LEDs with a constant current.

In accordance with embodiments of the invention, wide input voltage LED driver circuits and 120V/240V LED driver circuits include a dynamic current regulator. The dynamic current regulator comprises a resistor and capacitor in parallel to provide dynamic current regulation to a switching mode power supply circuit that controls the LED illumination.

In accordance with other embodiments of the invention, an LED driver circuit that can regulate the input signal voltage so that the driver circuit can be used over wide input voltage range or at predetermined voltages. Discrete components are used to drive an LED array with a constant current. The LED driver circuit includes a dynamic current regulator. The dynamic current regulator includes a resistor and capacitor in parallel to provide dynamic current regulation to a switching mode power supply circuit that controls the LED illumination.

In accordance with yet other embodiments of the invention, an LED driver circuit is provided. The circuit comprises a signal conditioning circuit configured to limit an input current from an incoming control signal. A voltage regulation circuit is included and is in parallel with the signal conditioning circuit, the voltage regulation circuit configured to limit a maximum voltage to a remaining portion of the LED driver circuit. A switching mode power supply circuit is also included and is in parallel with the voltage regulation circuit, the switching mode power supply circuit configured to deliver a load current to a load circuit, such that the load current is greater than the input current, the load circuit including an LED array. A dynamic current regulator circuit is in series with the switching mode power supply circuit, the dynamic current regulator circuit including a first capacitor in parallel with a first resistor, the dynamic current regulator circuit configured such that current through the first capacitor is greater than current through the first resistor.

To the accomplishment of the foregoing and related ends, the embodiments, then, comprise the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE DRAWINGS

The embodiments will hereafter be described with reference to the accompanying drawings, wherein like reference numerals denote like elements, and.

DETAILED DESCRIPTION OF THE INVENTION

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures. The figures depict selected embodiments and are not intended to limit the scope of embodiments of the invention. Skilled artisans will recognize the examples provided herein have many useful alternatives and fall within the scope of embodiments of the invention.

The following description refers to elements or features being "connected" or "coupled" together. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically. Thus, although schematics shown in the figures depict example arrangements of processing elements, additional intervening elements, devices, features, components, or code may be present in an actual embodiment.

Embodiments of the invention may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., digital signal processing elements, logic elements, diodes, etc., which may carry out a variety of functions under the control of one or more microprocessors or other control devices. Other embodiments may employ program code, or code in combination with other circuit components.

Turning now to the drawings, and referring first to FIG. 1, an exemplary embodiment of a driver circuit 20 will now be described. The block diagram of FIG. 1 can provide a controlled power to operate one or more small loads, such as one or more LEDs 22, as a non-limiting example. Embodiments are particularly well-suited to LEDs used with devices that have limited heat dissipation capabilities. Moreover, the embodiments may be used for circuits where input signals are applied in either alternating current (AC) or direct current (DC) form. The circuitry can effectively accept a wide range of voltage inputs, with the present embodiments being effective from between about 24VDC to about 240VDC, or more specifically between about 19VDC to about 264VDC for DC inputs, and between about 24VAC to about 240VAC, or more specifically between about 19VAC to about 264VAC for AC inputs, although it is to be appreciated that lower and higher voltages are considered. The input range ratio for both AC and DC inputs may be about 1 to 10, or about 1 to 14, for example.

The LED driver circuit 20 may be optimized to balance a variety of functions including: ride-thru of supply power disruptions, under current lockout, surge withstand capability, overall current consumption, LED current/brightness, and LED glow. A challenge for the circuit design was to include the minimum operating current feature so, for example, the circuit could be used reliably with triac type PLC outputs that have high leakage current (discussed in greater detail below).

The driver circuit 20 serves both to condition input signals and to regulate application of current to the downstream load, in the illustrated example, one or more LEDs 22. Thus, the driver circuit 20 is configured to accept a control signal 24, which may be either an AC or a DC signal, that provides an input voltage within the input voltage range.

The driver circuit 20 may include a variety of components including, but not limited to, a signal conditioning circuit 30, a rectifier circuit 32, a voltage regulation circuit 34, a switching mode power supply circuit 36, a dynamic current regulation circuit 38, and a load circuit 40. Each will be discussed in greater detail below.

Figure 2:
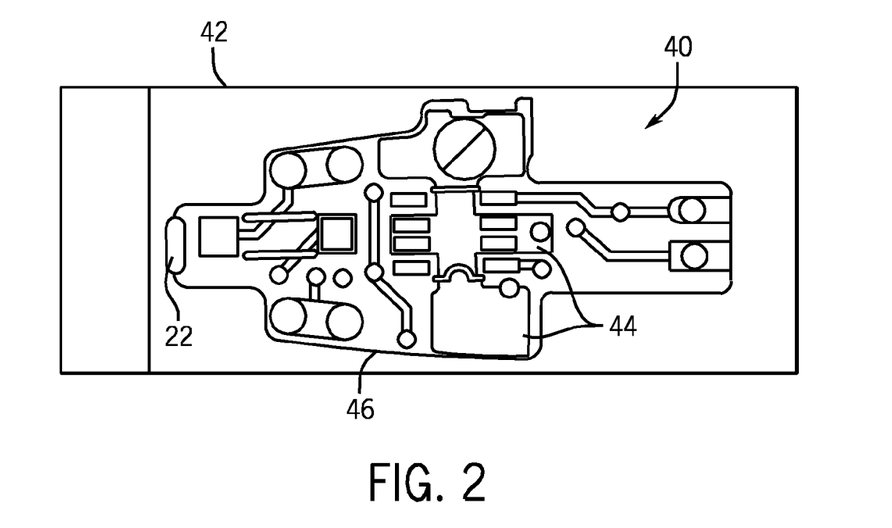
FIG. 2 is an elevational view of a printed circuit board on which a driver circuit according to embodiments of the present invention may be mounted.

FIG. 2 illustrates an exemplary circuit board configuration 40 on which the driver circuit 20 further described below may be supported. In the embodiment illustrated in FIG. 2, the circuit board 40 may be contoured so as to fit within a device, such as a pilot light 42 used in an industrial control application, as a non-limiting example. Circuit components 44, for example, are mounted on one or more surfaces of the circuit board 40, and are connected as described below. A periphery 46 of the circuit board may provide a convenient interface for engagement of the circuit board 40 within the pilot light 42. However, other alternative mounting structures and schemes are considered. In some embodiments, an extremity of the circuit board may support one or more LEDs 22 that provides a visual indication of the conductive state of the driver circuit 20 described below.

Figure 1:
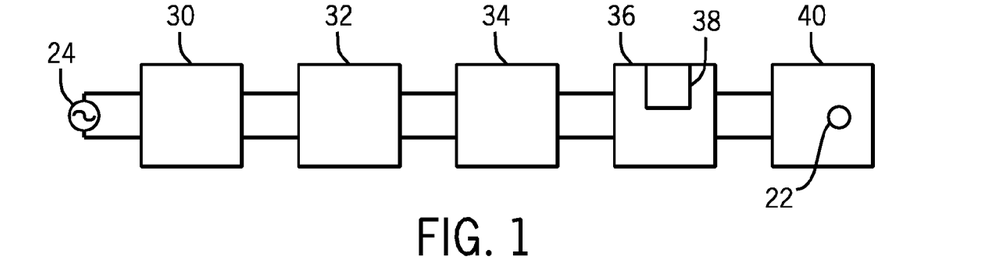
FIG. 1 is a block diagram of a driver circuit according to embodiments of the present invention.
Figure 3:
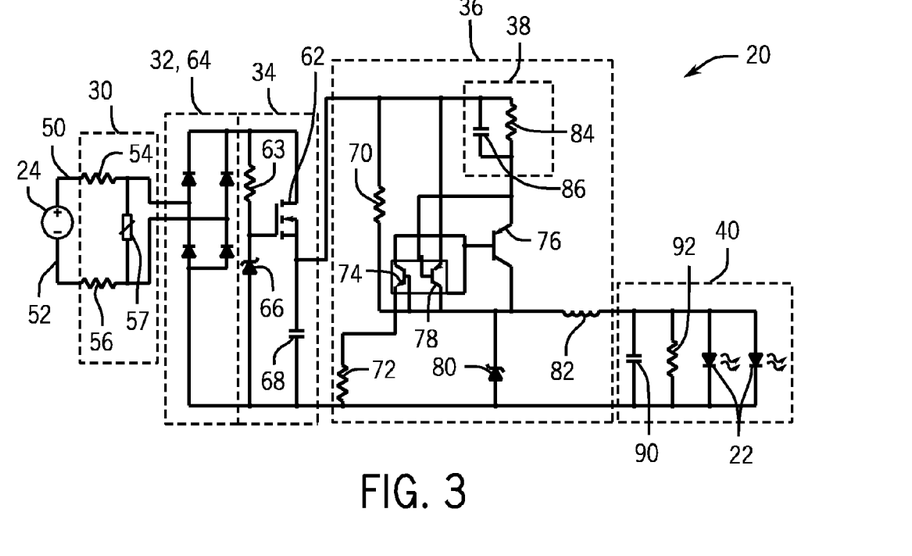
FIGS. 3 and 4 are circuit diagrams of exemplary driver circuits, such as that illustrated in FIG. 2.
Figure 4:
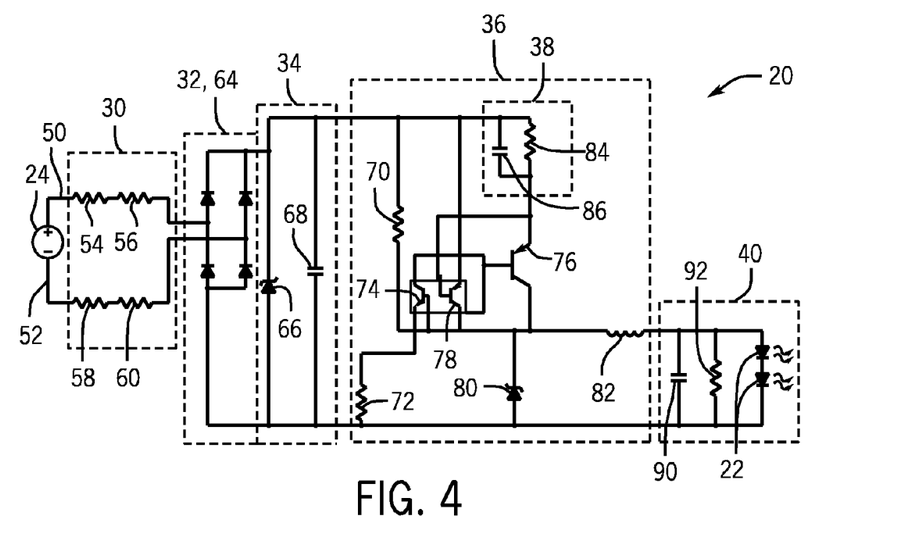

FIGS. 3 and 4 illustrate exemplary implementations of the functional block diagram illustrated in FIG. 1. The driver circuit 20 receives input control signals 24 via lines 50 and 52. The configuration of FIG. 3 is particularly adapted to an input voltage rating of between about 19VDC to about 264VDC for DC inputs and about 19VAC to about 264VAC for AC inputs, although other configurations and ratings can be envisaged.

The configuration of FIG. 4 is particularly adapted to an input voltage rating of approximately 120V AC or DC or 240V AC or DC, depending on the input resistor values, as discussed in greater detail below.

It is to be appreciated that other factors, such as tolerances, temperature, and altitude, for example, may affect predetermined component values described herein. One of ordinary skill in the art would appreciate that these values may vary depending on a variety of conditions.

In the circuit configurations of FIGS. 3 and 4, either AC or DC input control signals may be applied. A signal conditioning circuit 30 may include one or more input resistors that limit inrush current through the circuit. For example, in the circuit shown in FIG. 3, two input resistors 54 and 56 are shown. A varistor 57 (e.g., a metal-oxide varistor) is also shown in parallel with input resistors 54 and 56, and serves to suppress a line voltage surge. The varistor 57 may also be a transient voltage suppression diode, for example. In the circuit shown in FIG. 4, four resistors, 54, 56, 58 and 60 are shown, for example, and may be sized to support the input voltage ratings described above. For example, at an input voltage of about 120V, 2.4K ohm resistors may be used, and at an input voltage of about 240V, 15K ohm resistors may be used.

Voltage surges are common to industrial control circuits and can damage LEDs and components used in LED circuits. During a voltage surge, the input resistors help to 54, 56, 58 and 60 limit the amount of energy allowed to go through the remainder of the driver circuit 20. Higher input resister values helps to restrict the amount of surge current allowed to enter the driver circuit 20. The inclusion of the dynamic current regulation circuit 38 (discussed in greater detail below) allows for a much higher input resistor values for input resistors 54, 56, 58 and 60, when compared to conventional designs. Use of the dynamic current regulation circuit 38 also allows use of a higher resistor value for resistor 84. This allows less initial inrush current to turn on transistor 74. Less initial inrush current allows for higher input resistor values for input resistor 54, 56, 58, 60.

The signal conditioning circuit 30 appropriately regulates the incoming control signal 24 for application to a rectifier circuit 32. Rectifier circuit 32 serves to rectify AC waveforms to produce a DC control signal. While the rectifier circuit 32 is unnecessary in applications where a DC input control signal is available, the rectifier circuit 32 may be included in all implementations, where desired, to provide for a universal application of either AC or DC input signals. In some embodiments, a 0.5 A 600V full wave bridge 64, for example, may be used.

In voltage regulation circuit 34, a zener diode 66 and a capacitor 68 may follow the rectifier circuit 32. Voltage regulation circuit 34 sets the maximum voltage to the remaining circuit. The zener diode 66 helps to limit the voltage that is presented to the dynamic current regulation circuit 38, and the capacitor 68 helps to limit conducted EMI. In some embodiments, an 82V zener diode, for example, may be used. In some embodiments, a 2.2 uF capacitor, for example, may be used.

Circuit 34 shown in FIG. 3 also may include a MOSFET 62 and resistor 63. The gate voltage of the MOSFET 62 is determined by the zener voltage of zener diode 66. Resistor 63 is sized to control the current flowing into zener diode 66. Based on the input voltage range, voltage across the drain and source of MOSFET 62 will vary.

Figure 5:
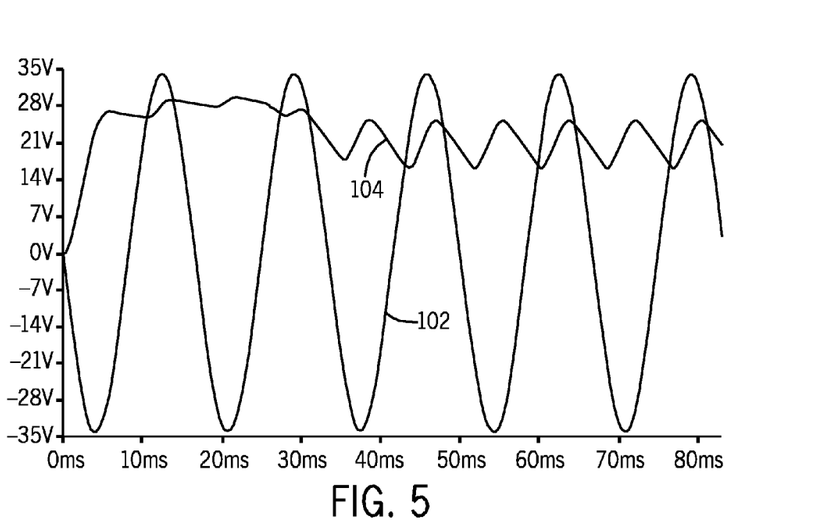
FIGS. 5 and 6 are graphs showing representative waveforms of a driver circuit when the input voltage is below the zener voltage of a zener diode according to embodiments of the present invention.
Figure 6:
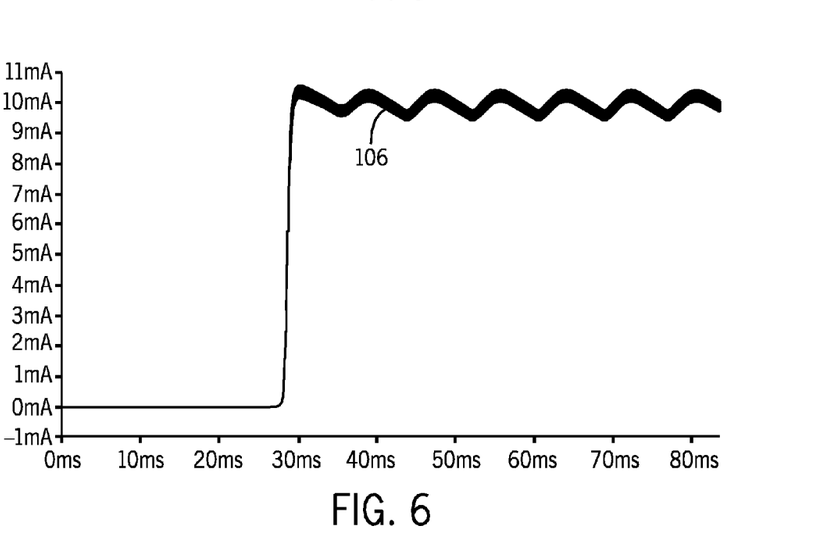

FIGS. 5 and 6 show representative waveforms when the input voltage 24 is below the zener voltage of zener diode 66. In this condition, the zener diode 66 will not be conducting current and there is very low voltage drop on MOSFET 62. Waveform 102 shows the input voltage at 24VAC. Waveform 104 shows the input voltage to the switching mode circuit 36. In this example, it can be seen that there is less than a 10V drop between the drain and source of MOSFET 62. FIG. 6 shows the resulting current waveform 106 to the LEDs 22 with a 24VAC input voltage.

Figure 7:
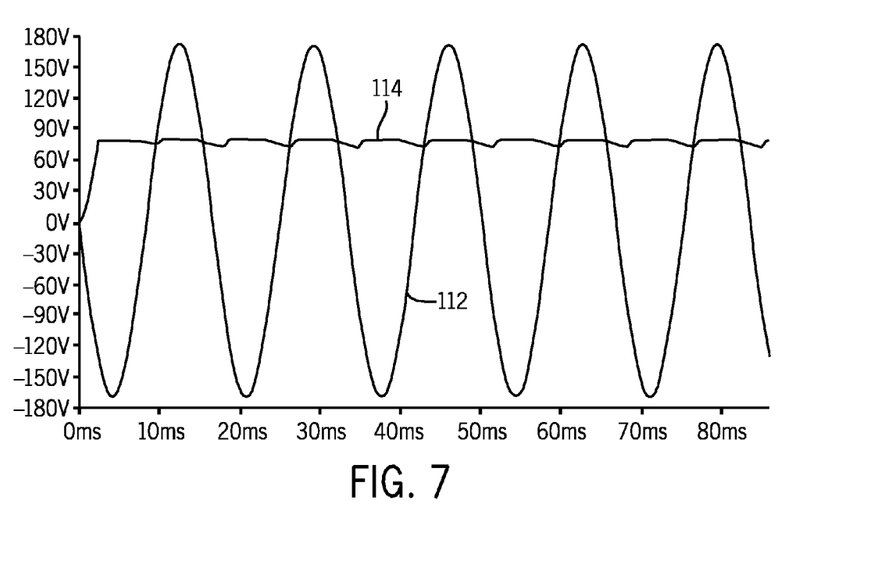
FIGS. 7 and 8 are graphs showing representative waveforms of a driver circuit when the input voltage is above the zener voltage of a zener diode according to embodiments of the present invention.
Figure 8:
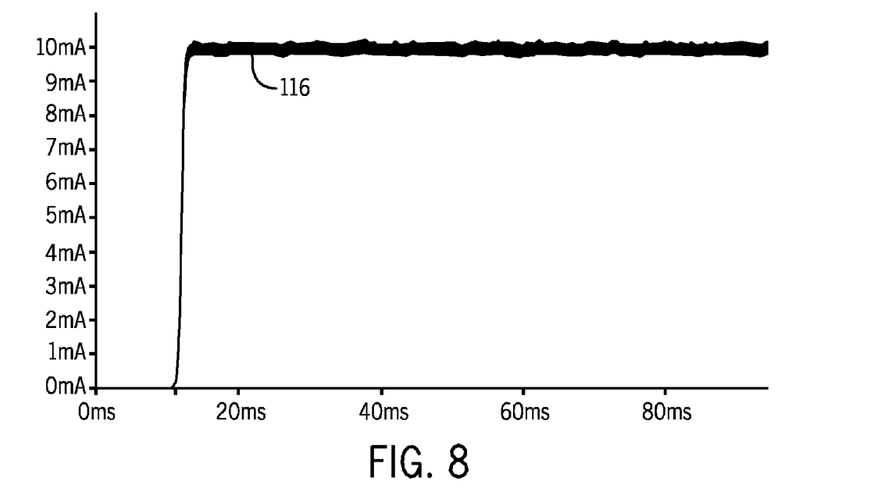

FIGS. 7 and 8 show representative waveforms when the input voltage 24 is above the zener voltage of zener diode 66. In this condition, the zener diode 66 will be conducting current and clamp down the voltage to its zener voltage. Input to the switching mode power supply circuit 36 can be determined by subtracting the gate-source voltage of MOSFET 62 from the zener diode 66 voltage. Waveform 112 shows the input voltage at 120VAC. Waveform 114 shows the input voltage to the switching mode power supply circuit 36. In this example, it can be seen that the voltage drop between the drain and source of MOSFET 62 could be as high as 100V. The input voltage to the switching mode power supply circuit 36 is very stable and is shown to be at about 80V. FIG. 8 shows the resulting current waveform 116 to the LEDs 22 with a 120VAC input voltage.

Both switching mode drivers and linear mode drivers are common types of power supplies used in LED driver circuits. The driver circuit 20 uses a switching mode power supply circuit 36 for universal circuits (i.e., 24V to 240V AC and DC) and discrete circuits (i.e., 120 VAC or 240 VAC).

The switching-mode power supply 36 is a power supply configuration that provides the power supply function through low loss components such as capacitors, inductors, and/or transformers, and the use of switches that are in either an on or off-state. An advantage of the switching mode power supply configuration is that the switching configuration dissipates very little power in either of these two states (on or off) and power conversion can be accomplished with minimal power loss. A switching mode LED driver circuit may be configured to deliver a much higher LED current compared to the input current.

When applying supply voltage to the switching mode power supply circuit 36, resistors 70 and 72 provide the current to turn on transistor 74. Representative values for resistors 70 and 72 are 49.9K ohm and 33.2K ohm, as non-limiting examples. With transistor 74 switched on, it provides the base current for a PNP transistor 76 and switches it on. With Schottky diode 80 reverse biased, current starts to flow through inductor 82 and LEDs 22.

A coil equation described by Equation 1 shows that a desired rise or fall of the inductor current requires a certain voltage step applied to the inductor 82, with the factor of proportionality L.

$$v_L(t) = L \times \frac{\Delta i_L(t)}{\Delta t} \quad \text{(Equation 1)}$$

As the collector current of transistor 76 increases, the voltage drop at the current sense resistor 84 and capacitor 86 increases. When the voltage drop reaches transistor 78 base-emitter turn-on voltage $V_{be(on)}$ of about 0.65 V, transistor 78 switches on and pulls the base of transistor 76 to the supply voltage and turns transistor 76 off.

In some embodiments, transistors 74 and 78 may be integrated into one component. For example, part number MMDT5451-7-F from Diodes Inc. of Plano Tex. may be used, although not required. Similarly, transistor 76 may be part number MMBT5401LT1G from Semiconductor Components Industries, LLC of Phoenix Ariz., although other transistors may be used.

Figure 9:
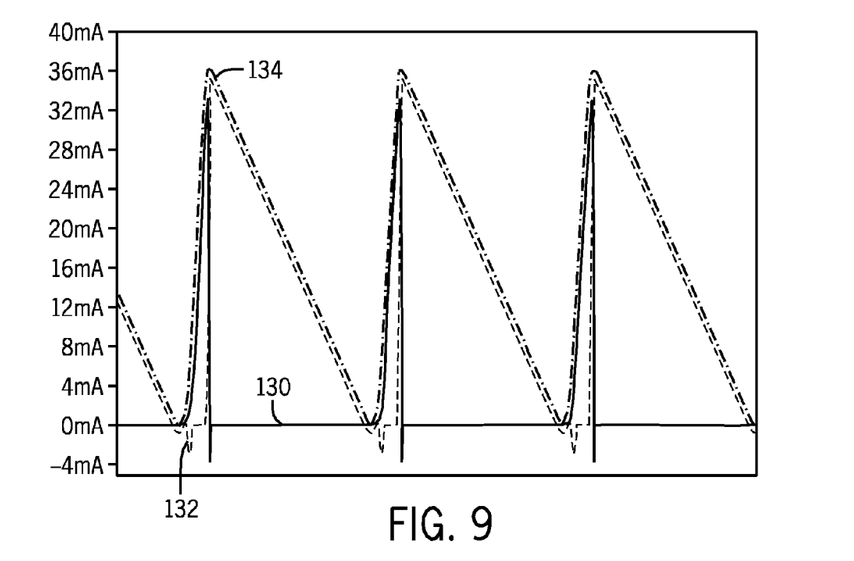
FIG. 9 is a graph showing representative waveforms of current flow through components of the driver circuit as the circuit cycles according to embodiments of the present invention.

The value of current sense resistor 84 and capacitor 86, therefore, sets the maximum input current in the application, which flows through current sense resistor 84, capacitor 86, transistor 76 and the inductor 82. When switching transistor 76 is off, its collector current almost immediately drops back to zero. The inductor 82, however, cannot change its current suddenly. The current will decrease but continues to flow in the same direction, with Schottky diode 80 now conducting. As Schottky diode 80 is forward biased, the voltage over inductor 82 reverses when transistor 76 is switched off. The voltage level at the cathode of the Schottky diode 80 is a negative forward voltage level, as long as there is energy stored in the inductor 82. When all the energy that was stored in the inductor 82 is delivered to the load circuit 40, Schokttky diode 80 becomes reversed biased again and the procedure is restarted. FIG. 9 shows representative waveforms of current flow through transistor 76 (waveform 130), Schokttky diode 80 (waveform 132), and inductor 82 (waveform 134) as the circuit 20 cycles.

Figure 10:
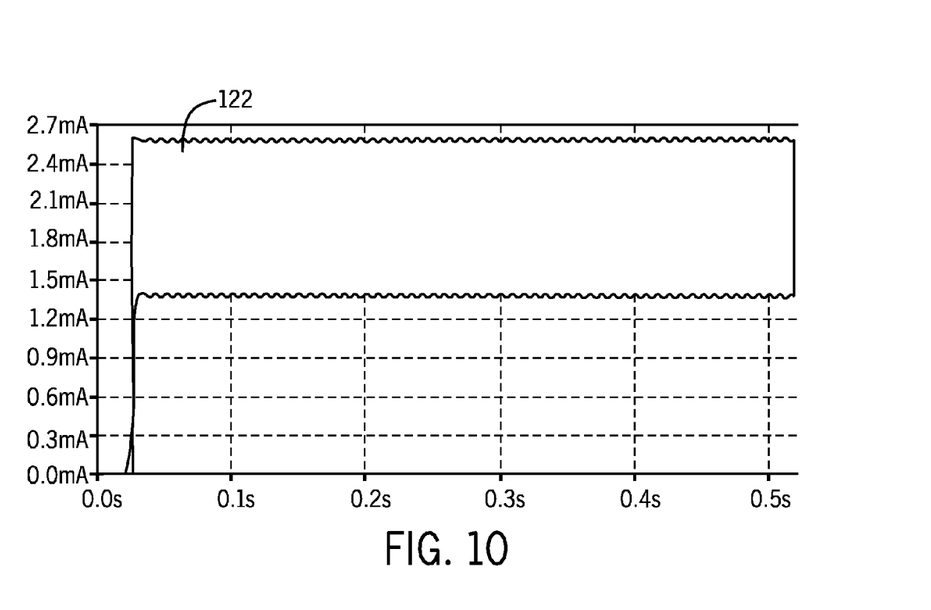
FIG. 10 is a graph showing a representative waveform of current flow for a current sense resistor of a dynamic current regulator circuit according to embodiments of the present invention.
Figure 11:
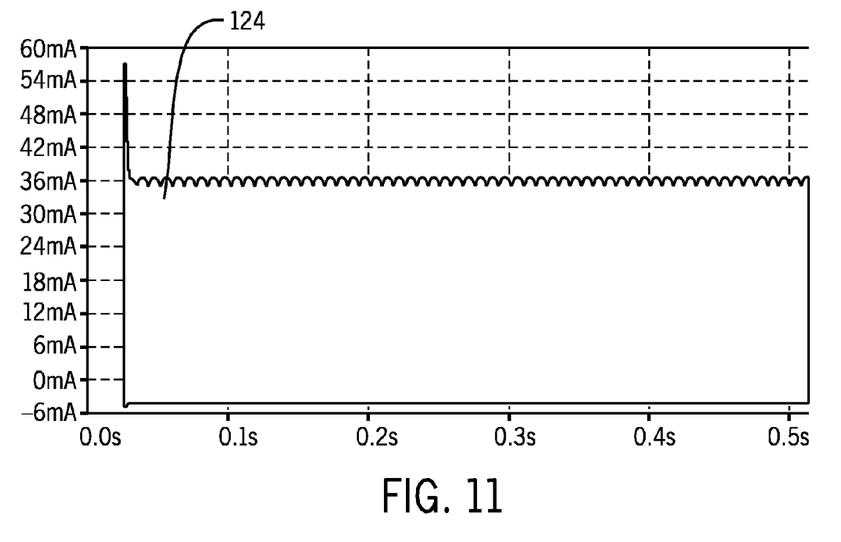
FIG. 11 is a graph showing a representative waveform of current flow for a capacitor of a dynamic current regulator circuit according to embodiments of the present invention.

The dynamic current regulator circuit 38 will start working when current going through the current sense resistor 84 reaches about 2 mA, at which point the transistor 76 will start switching current on and off. When circuit 36 gets into the switching current mode, high frequency AC current will start flowing through capacitor 86. In FIGS. 10 and 11, waveforms 122 and 124 show current flow for the current sense resistor 84 and the capacitor 86, respectively, of the dynamic current regulator circuit 38. The current flow for the current sense resistor 84 and the capacitor 86 can be calculated as follows:

$$I_{res} = \frac{V_{be}}{R} \quad \text{(Equation 2)}$$

$$I_{cap} = V_{be} \times 2\pi f C \quad \text{(Equation 3)}$$

where $V_{be}$ is the base-emitter voltage of the transistor 76 (about 0.5V-0.7V), and f is the frequency of the alternating current.

Figure 12:
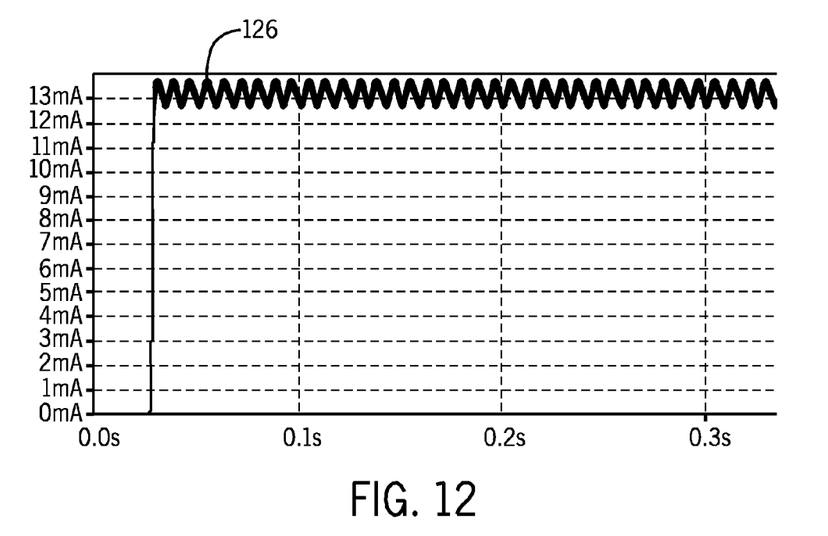
FIG. 12 is a graph showing a representative waveform of the current though an LED array according to embodiments of the present invention.

Similarly, waveform 126 in FIG. 12 illustrates the current though the LEDs 22. The LED current can be calculated as follows:

$$I_{led} = \frac{1}{2} \times I_{max} \quad \text{(Equation 4)}$$

As previously discussed above, supply power disruptions such as voltage dips and interruptions are common to industrial control circuits and can produce undesirable effects such as LED flickering or dimming. Ride-through is a term used to describe the ability to withstand voltage dips and interruptions with steady LED illumination. The driver circuit 20 is configured to maximize ride-through by allowing for a much higher resistance value of the current sense resistor 84, which expands the working voltage range of the driver circuit and the ability to provide steady illumination during voltage dips and interruptions. A high value for resistor 84 would turn on transistor 76 regardless of the initial status of the switching mode power supply circuit 36, while a low value for resistor 84 would not keep transistor 74 on during the events of voltage dips and interruptions.

When a control signal 24 is applied to the driver circuit 20, the dynamic current regulation circuit 38 may have a voltage drop across the resistor 84, which allows the transistor 76 to start switching current. After the transistor 76 starts switching, the circuit is designed to minimize current across resistor 84 with most of the current passing through the capacitor 86 (see FIGS. 5 and 6). As can be seen, the current going through the resistor 84 is less than 3 mA compared to about 30 mA rms current through the capacitor 86. This design provides higher efficiencies when compared to conventional designs that use only a current regulation resistor. Benefits include lower power consumption, less heat generated and higher LED driving current for improved illumination.

LED glow is a term used to describe an undesirable effect where an LED is slightly illuminated due to off-state leakage current in the control circuit. Off-state leakage current is a condition where the control circuit is in the off-state but a small amount of voltage and current is still present. Off-state leakage current is typically produced by control circuit devices such as Programmable Logic Controller (PLC) outputs with triac outputs. Triacs are known for having off-state leakage current in the low milliamp range. The current sense resistor 84 used in the dynamic current regulation circuit 38 along with the higher input resistor values 54, 56, 58, 60 in the signal conditioning circuit 30 provide a higher threshold of current needed to initiate the transistor 76 switching and illuminate LEDs 22, i.e., higher than a triac leakage current. The higher threshold of current prevents LED glow from occurring when off-state leakage current is present.

The load circuit 40 may include an LED array of at least one LED 22, along with a capacitor 90 and resistor 92. LEDs 22 may be used to provide an indication of the operative state of the device (i.e., a pilot light powered or unpowered). Capacitor 90 acts as a charge storage device and smoothes the sawtooth ripple current. The larger the capacitor 90, the smoother the current to the LEDs 22. In some embodiments, a 10 uF capacitor may be used, for example. Resistor 92 shunts current away from the LEDs and does not allow the LEDs 22 to turn on until a predetermined minimum current level, such as 2 mA, for example, is reached. A typical value for resistor 92 is 1K ohm, for example.

In some embodiments, an LED array may include LEDs in parallel, and in other embodiments, an LED may include LEDs in series. This can be considered a trade-off between input voltage and input current. With LEDs in parallel, less voltage and higher current is required to turn on the LEDs. It is just the opposite when the LEDs are wired in series.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Finally, it is expressly contemplated that any of the processes or steps described herein may be combined, eliminated, or reordered. Accordingly, this description is meant to be taken only by way of example, and not to otherwise limit the scope of this invention.

We claim:
1. An LED driver circuit, the circuit comprising:
a signal conditioning circuit configured to limit an input current from an incoming control signal;
a voltage regulation circuit in parallel with the signal conditioning circuit, the voltage regulation circuit configured to limit a maximum voltage to a remaining portion of the LED driver circuit;
a rectifier circuit in parallel with the signal conditioning circuit and the voltage regulation circuit;
a switching mode power supply circuit in parallel with the voltage regulation circuit, the switching mode power supply circuit configured to deliver a load current to a load circuit, such that the load current is greater than the input current, the load circuit including an LED array; and
a dynamic current regulator circuit in series with the switching mode power supply circuit, the dynamic current regulator circuit including a first capacitor in parallel with a first resistor, the dynamic current regulator circuit configured such that current through the first capacitor is greater than current through the first resistor.

2. The circuit according to claim 1,
wherein the signal conditioning circuit includes at least two input resistors in parallel.

3. The circuit according to claim 1,
wherein the load circuit further includes a resistor in parallel with a capacitor, the resistor configured to limit turn on of the LED array until a predetermined minimum current level is reached, and the capacitor configured to smooth the current to the LED array.

4. The circuit according to claim 1,
wherein the switching mode power supply circuit includes an inductor in series with the load circuit.

5. The circuit according to claim 1,
wherein the switching mode power supply circuit includes a Schottky diode in parallel with the load circuit.

6. The circuit according to claim 1,
wherein the switching mode power supply circuit includes at least a first transistor, a second transistor, and a third transistor.

7. The circuit according to claim 6,
wherein the first resistor is sized to turn on the third transistor regardless of an initial status of the switching mode power supply circuit.

8. The circuit according to claim 1,
wherein the voltage regulation circuit includes a zener diode in parallel with a second capacitor.

9. The circuit according to claim 8,
wherein the voltage regulation circuit further includes a second resistor in series with the zener diode, and a MOSFET in series with the second capacitor.

10. A power supply circuit for a load, the circuit comprising:
a signal conditioning circuit configured to regulate an incoming control signal, the incoming control signal to range from about 19VAC to about 264VAC and about 19VDC to about 264VDC;
a switching mode power supply circuit in parallel with the signal conditioning circuit, the switching mode power supply circuit including at least a first transistor, a second transistor and a third transistor the switching mode power supply circuit configured to deliver a load current to a load circuit, such that the load current is greater than the input current, the load circuit including an LED array; and
a dynamic current regulator circuit in series with the switching mode power supply circuit, the dynamic current regulator circuit including a first capacitor in parallel with a first resistor, the dynamic current regulator circuit configured such that current through the first capacitor is greater than current through the first resistor.

11. The circuit according to claim 10,
further including a voltage regulation circuit in parallel with the signal conditioning circuit, the voltage regulation circuit configured to limit a maximum voltage to a remaining portion of the LED driver circuit.

12. The circuit according to claim 10,
wherein the current through the first capacitor ($I_{cap}$) is computed using the formula:

$$I_{cap} = V_{be} \times 2\pi fC$$

where $V_{be}$ is the base-emitter voltage of the third transistor and f is the frequency of the current.

13. The circuit according to claim 12,
wherein the base-emitter voltage of the third transistor can range from about 0.5V to about 0.7V.

14. A method for providing power to a load, the method comprising:
regulating an incoming control signal, the incoming control signal ranging from about 19VAC to about 264VAC and about 19VDC to about 264VDC;
providing a switching mode power supply circuit in parallel with the signal conditioning circuit, the switching mode power supply circuit including at least a first transistor, a second transistor and a third transistor, the switching mode power supply circuit configured for delivering a load current to a load circuit, such that the load current is greater than the input current, the load circuit including an LED array; and
providing a dynamic current regulator circuit in series with the switching mode power supply circuit, the dynamic current regulator circuit including a first capacitor in parallel with a first resistor, the dynamic current regulator circuit configured such that current through the first capacitor is greater than current through the first resistor.

15. The method according to claim 14,
further including limiting turn on of the LED array until a predetermined minimum current level is reached.

16. The method according to claim 15,
further including turning on the third transistor regardless of an initial status of the switching mode power supply circuit.

17. An LED driver circuit, the circuit comprising:
a power signal conditioning circuit configured to limit an input current from an incoming AC or DC power supply, the input current from the incoming AC or DC power supply powering the LED driver circuit;
a voltage regulation circuit in parallel with the signal conditioning circuit, the voltage regulation circuit configured to limit a maximum voltage to a remaining portion of the LED driver circuit;
a switching mode power supply circuit in parallel with the voltage regulation circuit, the switching mode power supply circuit configured to deliver a load current to a load circuit, such that the load current is greater than the input current, the load circuit including an LED array; and
a dynamic current regulator circuit in series with the switching mode power supply circuit, the dynamic current regulator circuit including a first capacitor in parallel with a first resistor, the dynamic current regulator circuit configured such that current through the first capacitor is greater than current through the first resistor.

* * * * *